United States Patent [19]

Pointer

[11] Patent Number: 4,666,245

[45] Date of Patent: May 19, 1987

[54] FIBRE-OPTIC CABLE ASSEMBLIES AND RADIATION PYROMETERS

[75] Inventor: John Pointer, Basingstoke, England

[73] Assignee: Smiths Industries Public Limited Company, London, England

[21] Appl. No.: 668,847

[22] Filed: Nov. 6, 1984

[30] Foreign Application Priority Data

Nov. 18, 1983 [GB] United Kingdom ............... 8330813

[51] Int. Cl.[4] ............................ G02B 6/04; G01J 5/48
[52] U.S. Cl. ................................. 350/96.24; 356/43; 374/131
[58] Field of Search ............... 350/96.24, 96.25, 96.26; 356/43, 45; 374/120, 121, 130, 131

[56] References Cited

U.S. PATENT DOCUMENTS

| | | | |
|---|---|---|---|
| 3,739,184 | 6/1973 | Katsumata et al. | 350/96.26 |
| 4,173,392 | 11/1979 | Ekinaka et al. | 350/96.26 |
| 4,253,447 | 3/1981 | Moore et al. | 350/96.26 |
| 4,272,156 | 6/1981 | Ishibashi et al. | 350/96.24 |
| 4,352,550 | 10/1982 | Uchida | 350/96.24 |
| 4,408,827 | 10/1983 | Guthrie et al. | 356/43 X |
| 4,568,183 | 2/1986 | Douglas | 356/43 |

FOREIGN PATENT DOCUMENTS

| | | |
|---|---|---|
| 0095043 | 11/1983 | European Pat. Off. |
| 964567 | 7/1964 | United Kingdom |
| 1215428 | 12/1970 | United Kingdom |
| 1320776 | 6/1973 | United Kingdom |
| 1319879 | 6/1973 | United Kingdom |
| 1376304 | 12/1974 | United Kingdom |
| 1413435 | 11/1975 | United Kingdom |
| 2027928 | 2/1980 | United Kingdom |

Primary Examiner—William L. Sikes
Assistant Examiner—Frank González
Attorney, Agent, or Firm—Pollock, VandeSande and Priddy

[57] ABSTRACT

A radiation pyrometer for a gas-turbine engine has a fibre-optic cable with three discrete bundles. At one end of the cable, the bundles, are arranged in a jig with one bundle being positioned centrally, being the other bundles which are of C-shape and located on opposite sides of the central bundle. A converging lens focusses radiation from the turbine blades onto the end of the cable, the ends of the bundle being oriented such that each bundle receives radiation from a different region spaced along the length of the blades. At the other end of the cable, each bundle is connected to a respective detector.

8 Claims, 7 Drawing Figures

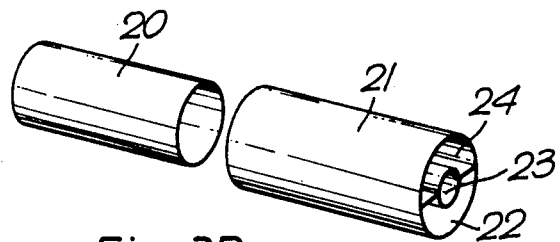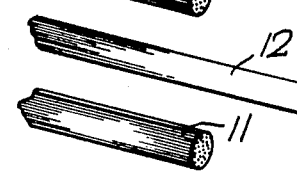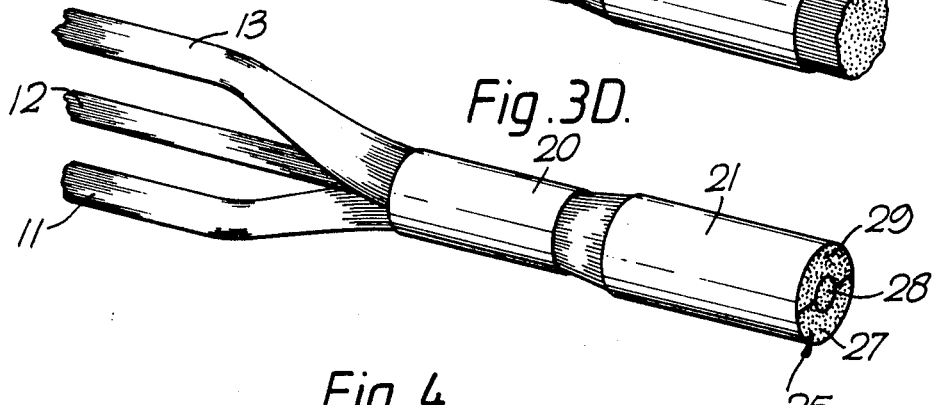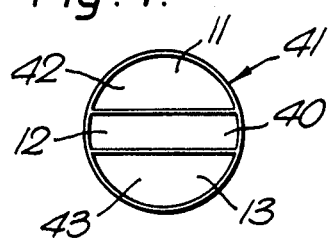

FIBRE-OPTIC CABLE ASSEMBLIES AND RADIATION PYROMETERS

BACKGROUND OF THE INVENTION

This invention relates to fibre-optic cable assemblies, their methods of manufacture, and pyrometers.

The invention is more particularly, but not exclusively, concerned with assemblies for use in radiation pyrometry.

In radiation pyrometry, and other applications in a high-temperature environment, it can be desirable to mount a radiation detector remotely from the source or object being monitored and to use a fibre-optic cable to transmit radiation to the detector. This can also have advantages in normal environments where access is restricted, since the fibre-optic cable can readily be mounted in inaccessible locations and where space is limited.

Conventionally, a lens or other device is used to focus radiation from a source onto the end of the cable. Where it is necessary to distinguish between radiation from different parts of the source, a coherent bundle of fibres may be used. In this way, since each fibre in the bundle has both ends at identical locations, an image focussed on one end of the cable is reproduced identically at the other end. Coherent fibre bundles are, however, difficult to manufacture and are considerably more expensive than non-coherent bundles. Alternatively, the fibre-optic cable may have several separate non-coherent bundles of fibres, the ends of which are spaced apart from one another in a row at one end of the cable, and the other ends of which can be led off to separate detectors. While this arrangement is less expensive, it suffers from the disadvantage of being less efficient because only a small proportion of the radiation captured by the lens is transmitted along the cable.

BRIEF SUMMARY OF THE INVENTION

It is an object of the present invention to provide a fibre-optic assembly, a method of manufacture of such an assembly, and a radiation pyrometer that can be used to alleviate the above-mentioned disadvantages.

According to one aspect of the present invention there is provided a fibre-optic cable assembly having at least three bundles of optical fibres, the bundles being mounted together at one end of said assembly so that the ends of said bundles form a substantially flat end surface of said assembly of substantially circular shape, the end of two of said bundles being of substantially segment shape and being located opposite one another, the or each other bundle being located between the first two of said bundles, substantially centrally of said end surface, and the assembly being arranged such that the one end of each said bundle receives radiation from a different region.

The other bundle may be of circular shape, and the first two of the bundles of substantially C-shape. Alternatively, the other bundle may extend across the entire face of the one end of the assembly. The ends of the bundles may be retained together in a jig. Preferably the assembly includes a converging lens arranged to focus radiation onto the said one end of each said bundle.

According to another aspect of the present invention there is provided a radiation pyrometer including a fibre-optic cable assembly according to the one aspect of the present invention.

According to a further aspect of the present invention there is provided a radiation pyrometer including: a fibre-optic cable assembly having at least three discrete bundles of optical fibres, the bundles being mounted together at one end of said assembly such that the ends of said bundles form a substantially flat end surface of said assembly of substantially circular shape, the ends of two of said bundles being of substantially segment shape and being located opposite one another, and the or each other bundle being located between the first two of said bundles, substantially centrally of said end surface; means for focussing onto the said one end of each bundle radiation from a different region; and a plurality of radiation detector means associated respectively with the other end of each said bundle.

The radiation pyrometer may be used for sensing the temperature of the blades of a gas-turbine engine, the one end of said bundles of said cable assembly being arranged such that each said bundle receives radiation from different regions spaced along the length of the blades.

According to yet another aspect of the present invention there is provided a method of making a fibre-optic cable assembly including the steps of providing three discrete bundles of optical fibres; leading one end of each said bundle through a ferrule and into respective apertures in a jig, said jig comprising a central aperture for receiving a first bundle, and two apertures extending along opposite sides of said central aperture for receiving respective ones of the other two bundles; and bonding the fibres of said bundles in position.

The fibres of said bundles may be bonded to the jig, or the said jig may be removed prior to bonding the fibres in position.

A radiation pyrometer including a fibre-optic cable assembly, both in accordance with the present invention, and for use in a gas-turbine engine, will now be described, by way of example, with reference to the accompanying drawings.

BRIEF DESCRIPTION OF THE DRAWINGS

FIGS. 3A to 3D illustrate a method of making the cable assembly; and FIG. 4 shows the end of an alternative cable assembly.

DETAILED DESCRIPTION

Figure 1:
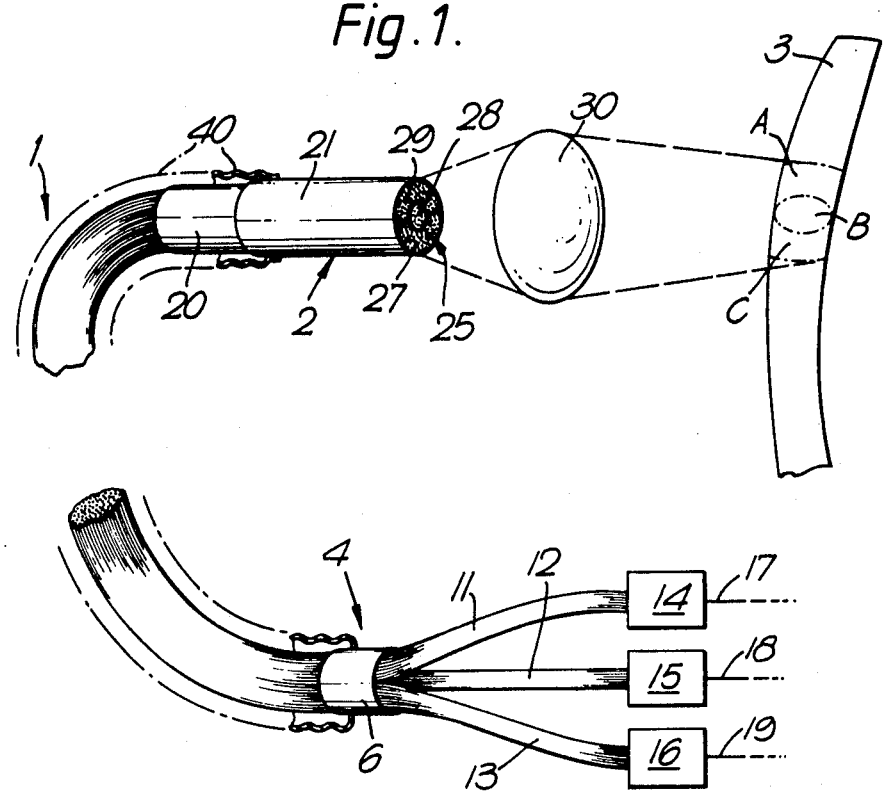
FIG. 1 shows the pyrometer schematically.
Figure 2:
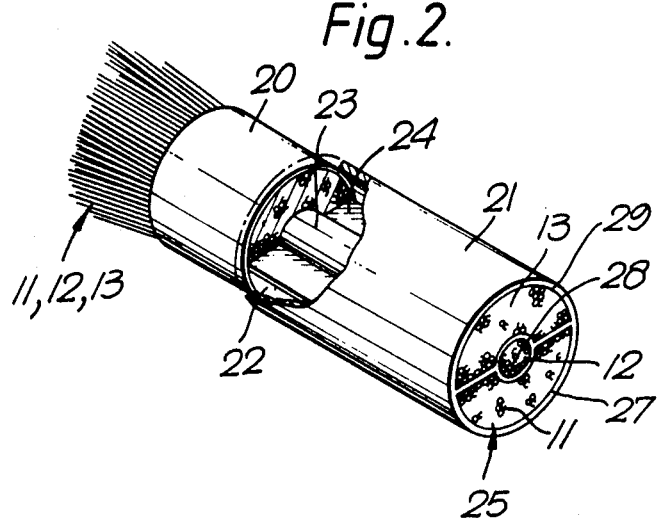
FIG. 2 is an enlarged cut-away perspective view of one end of the fibre-optic cable assembly

With reference to FIGS. 1 and 2, the pyrometer system is installed in a gas-turbine engine and comprises a fibre-optic cable assembly 1 onto the forward end 2 of which is focussed radiation from a turbine blade 3. At its rear end 4, the cable assembly 1 is divided into three separate bundles 11, 12 and 13 which extend to respective radiation detectors 14, 15 and 16. Each bundle 11 to 13 supplies radiation to its associated detector 14 to 16 in respect of a different area of the turbine blade 3.

At the forward end 2 of the cable assembly 1, the ends of each bundle 11 to 13 extend together through a cylindrical ferrule 20 that is located rearwardly of a forming jig 21. The jig 21 is divided into three separate longitudinal passages 22, 23 and 24, each bundle passing through a respective one of the passages and terminating at the forward end of the jig to form a flat, polished end surface 25. One passage 23 is cylindrical in shape and is located centrally of the jig. The other two passages 22 and 24 are located on opposite sides of the central passage 23 and are of substantially segment shape, or more precisely of C-shape, in section, each passage 22 and 24 extending half way around the circumference of the central passage 23. The end surface 25 of the cable assembly 1 is thereby divided into three areas: a central circular area 28 and two areas 27 and 29 of C-shape extending around opposite halves of the central area.

Radiation from the turbine blade 3 is focussed on the end surface 25 of the cable assembly 1 by a converging lens 30, although it will be appreciated that a mirror or small aperture could also be used. The radiation imaged on the end of each bundle 11 to 13 is therefore representative of the radiation from three different regions of the blade, labelled A, B and C respectively in FIG. 1.

The three fibre bundles 11 to 13 extend rearwardly along the length of the cable assembly 1 to its rear end 4. The bundles 11 to 13 may be enclosed along their length by an outer sleeve 40 that is sealed at opposite ends of the assembly. At the rear end 4 of the cable assembly, the bundles 11 to 13 emerge from a rear ferrule 6, to which they are bonded, and extend to respective radiation detectors 14, 15 and 16. The detectors 14 to 16 provide electrical outputs on lines 17 to 19 respectively in accordance with the levels of radiation.

The forward end 2 of the cable assembly 1 is oriented such that the three regions A, B and C from which radiation is received are spaced along the length of the blades 3. In this way, by monitoring the outputs of the detectors 14, 15 and 16 it is possible to obtain an indication of the temperature profile along the blades. The compact arrangement of the forward end of the fibre bundles ensures that a large proportion of radiation focussed on the image plane of the lens 30 is transmitted along the cable assembly 1.

The fibre-optic cable assembly is assembled in the manner shown in FIGS. 3A to 3D. The fibre bundle 12 is first threaded through the ferrule 20 and along the central passage 23 of the jig 21 so that it emerges from the forward end of the jig by a short distance, as shown in FIG. 3B. The other fibre bundles 11 and 13 are then also threaded through the ferrule 20 and along the passages 22 and 24 respectively so that they emerge a short distance from the forward end of the jig 21, as shown in FIG. 3C. The fibres are sealed in the jig 21 by means of an adhesive or by heat bonding. After securing the fibres, the projecting ends are cut and polished to form a flat end surface of the cable.

If the fibres are tightly packed in the ferrule 20, the jig 21 can be removed immediately after the bundles have been correctly positioned. The fibres are then bonded to the ferrule 20 rather than the jig 21, and the ends of the fibres cut close to the end of the ferrule.

An additional jig (not shown) of similar shape to the jig 21 may be located rearwardly of the ferrule 20 so as to ensure that the fibre bundles lie parallel in the ferrule.

The method may be used to make fibre-optic cable assemblies having a different configuration of fibre-bundles at their ends. In this respect the central aperture 40 of a jig 41 may extend completely across the width of the jig, such as shown in FIG. 4, with the other two apertures 42 and 43 having straight edges against opposite sides of the central aperture.

What I claim is:

1. A radiation pyrometer including radiation detector means and a fibre-optic cable assembly comprising at least three discrete bundles of optical fibres, means mounting the bundles together at one end of said assembly so that said bundles at the one end form a substantially flat, circular end surface of said assembly, and means for focussing radiation from different regions onto the one end of different ones of said bundles, the said one end of two of said bundles being of substantially segment shape and being located opposite one another, each other bundle being located between the first two of said bundles, substantially centrally of said end surface so that the said one end of each bundle receives radiation from a different region, and each said bundle extending to said radiation detector means so that said radiation detector means provides at least three outputs in respect of radiation in each said region.

2. A radiation pyrometer according to claim 1, wherein the said other bundle is of circular shape, and wherein the first two of said bundles are of substantially C-shape.

3. A radiation pyrometer according to claim 1, wherein the other bundle extends across the entire face of the said one end of said assembly.

4. A radiation pyrometer according to claim 1, including a jig, the said bundles being retained together in said jig at said one end.

5. A radiation pyrometer according to claim 1, wherein the means for focussing radiation onto the said one end of the bundles includes a converging lens.

6. A radiation pyrometer including radiation detector means and a fibre-optic cable assembly comprising three discrete bundles of optical fibres, a jig mounting the bundles together at one end of said assembly so that said bundles at the one end form a substantially flat, circular end surface of said assembly, the said one end of the first two of said bundles being of substantially C-shape and the said one end of the third bundle being of substantially circular shape and being located between the first two bundles centrally of said end surface, the cable assembly including a converging lens that focusses radiation from different regions onto the said one end of different ones of said bundles, and each said bundle extending to said radiation detector means so that said radiation detector means provides three outputs in respect of radiation in each said region.

7. A radiation pyrometer according to claim 1 wherein said pyrometer is used to sense the temperature of the blades of a gas-turbine engine, wherein the said one end of said bundles of said cable assembly are oriented such that each said bundle receives radiation from different regions spaced along the length of the blades.

8. A radiation pyrometer for sensing the temperature of different regions spaced along the length of the blades of a gas-turbine engine, said pyrometer comprising: three radiation detectors, a fibre-optic cable assembly comprising three discrete bundles of optical fibres, a jig mounting the bundles together at one end of said assembly so that said bundles at the one end form a substantially flat, circular end surface of said assembly, the said one end of the first two of said bundles being of substantially C-shape and the said one end of the third bundle being of substantially circular shape and being located between the first two bundles centrally of said end surface, the cable assembly including a converging lens that focusses radiation from said tubine blades into the said end surface, the said end surface being oriented such that each said bundle receives radiation from different regions spaced along the length of the blades, and each said bundle extending to a respective one of said radiation detectors so that each radiation detector provides an output in respect of a different region of the blades.

* * * * *